S. SHULTZ.
Wagon-Brakes.
No. 155,548. Patented Sept. 29, 1874.
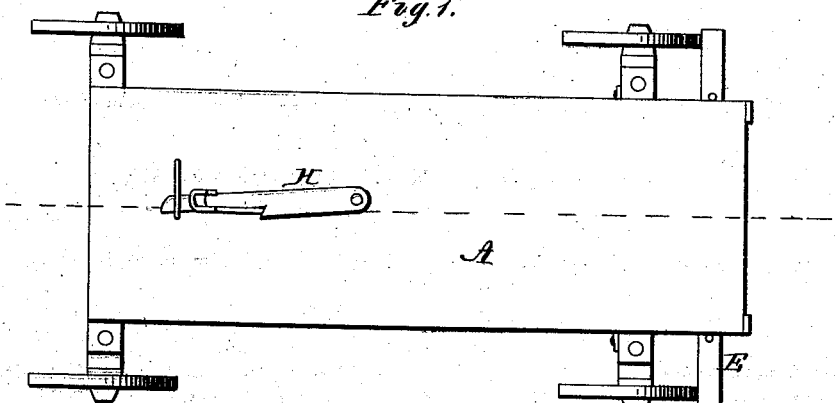
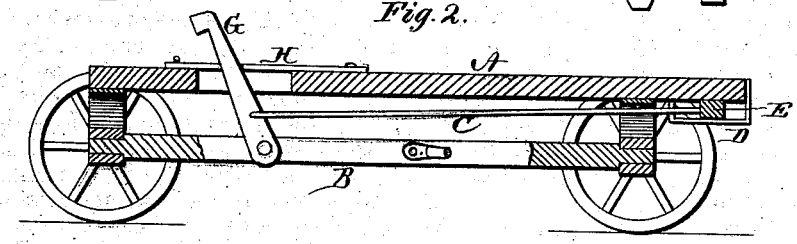
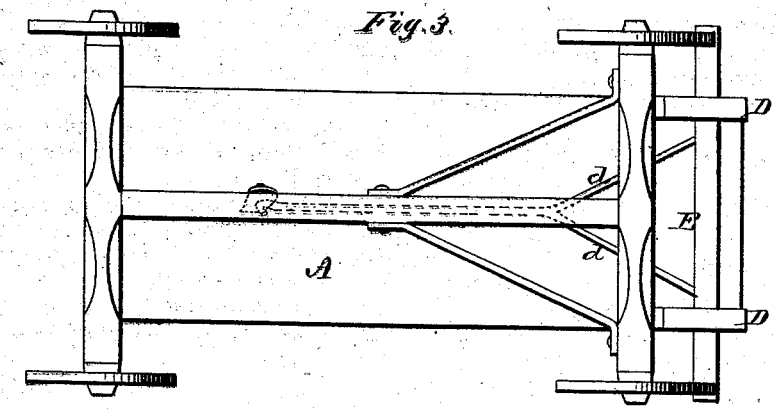
WITNESSES
INVENTOR
Samuel Shultz
per Alexander Amason
Attorneys

UNITED STATES PATENT OFFICE.

SAMUEL SHULTZ, OF MADISON COUNTY, MISSOURI.

IMPROVEMENT IN WAGON-BRAKES.

Specification forming part of Letters Patent No. 155,548, dated September 29, 1874; application filed August 6, 1874.

*To all whom it may concern:*

Be it known that I, SAMUEL SHULTZ, in the county of Madison and in the State of Missouri, have invented certain new and useful Improvements in Wagon-Brakes; and do hereby declare that the following is a full, clear, and exact description thereof, reference being had to the accompanying drawings, and to the letters of reference marked thereon, making a part of this specification.

The nature of my invention consists in the peculiar construction and arrangement of a carriage or wagon-brake, as will be hereinafter set forth.

In the annexed drawings, making part of this specification, Figure 1 represents a plan view, Fig. 2 a longitudinal section, and Fig. 3 a bottom view, of a wagon with my brake attached.

In the figures, A represents the bed or bottom of a wagon, said bed being supported upon a body and wheels of any ordinary construction. B represents the coupling or reach of the wagon. Lying just above this reach is a metallic rod, C, which has two branches, $d$ $d$, at its rear end. These branches connect to the brake-bar E, which acts upon the wheels at their rear; consequently, when applied, it rides up on the wheel, and lifts the rear end of the wagon-bed, thus relieving the weight from the springs in going down hill or stopping suddenly. The brake-bar rests and plays to or from the wheels in two metallic boxes or loops, D D, as seen in Fig. 3. G represents a lever, which is pivoted to the reach at one end, and which has a foot-piece at its other. This lever is also pivoted to the rod C, or has said rod hooked to it a little below its center. The lever passes through the floor or bed of the wagon, and works in a slot in said bed. A bar, H, is pivoted upon the upper side of the bed or bottom, and has an offset in it, against which the lever catches, in order to station it when the brakes are applied. By connecting the lever and the reach in this manner to the rod C, which connects to the brake-bar, it will be seen that both the rear as well as the front portions of the wagon are raised, when the brakes are applied, and the springs relieved of weight or strain.

Having thus fully described my invention, what I claim as new, and desire to secure by Letters Patent, is—

The combination, with a wagon bed and reach, of the brake-bar E, rod C, loops D D, lever G, and bar H, all to operate as and for the purpose specified.

In testimony that I claim the foregoing I have hereunto set my hand this 14th day of July, 1874.

SAMUEL SHULTZ.

Witnesses:
   H. A. HALL,
   C. L. EVERT.